US009884399B2

(12) United States Patent
Theriault (10) Patent No.: US 9,884,399 B2
(45) Date of Patent: Feb. 6, 2018

(54) HINGE MECHANISM FOR SMALL OPTICS AND RELATED METHODS

(71) Applicant: RAYTHEON COMPANY, Waltham, MA (US)

(72) Inventor: Philip Christopher Theriault, Tucson, AZ (US)

(73) Assignee: RAYTHEON COMPANY, Waltham, MA (US)

( * ) Notice: Subject to any disclaimer, the term of this patent is extended or adjusted under 35 U.S.C. 154(b) by 578 days.

(21) Appl. No.: 14/161,205

(22) Filed: Jan. 22, 2014

(65) Prior Publication Data

US 2014/0134928 A1    May 15, 2014

Related U.S. Application Data

(63) Continuation of application No. 13/365,399, filed on Feb. 3, 2012, now abandoned.

(51) Int. Cl.
*B24B 15/00* (2006.01)
*G02B 7/182* (2006.01)
*B24B 19/22* (2006.01)

(52) U.S. Cl.
CPC ............. *B24B 19/22* (2013.01); *B24B 15/00* (2013.01); *G02B 7/1822* (2013.01); *G02B 7/1824* (2013.01)

(58) Field of Classification Search
CPC .... G02B 7/182; G02B 7/1821; G02B 7/1822; G02B 7/198; G02B 7/1824; B24B 19/22; B24B 15/00; B24B 15/08
USPC .......................................................... 359/877
See application file for complete search history.

(56) References Cited

U.S. PATENT DOCUMENTS

| | | | | |
|---|---|---|---|---|
| 2,703,263 | A | * | 3/1955 | Zernov .......................... 384/430 |
| 2003/0086240 | A1 | * | 5/2003 | Jobs et al. ..................... 361/683 |
| 2004/0233523 | A1 | | 11/2004 | Hachkowski et al. |
| 2004/0246577 | A1 | | 12/2004 | Hachkowski et al. |
| 2005/0046979 | A1 | * | 3/2005 | Hiley et al. ................... 359/877 |
| 2005/0094264 | A1 | | 5/2005 | Hachkowski et al. |
| 2010/0297391 | A1 | * | 11/2010 | Kley ............................. 428/141 |
| 2013/0201571 | A1 | | 8/2013 | Theriault |

* cited by examiner

*Primary Examiner* — Marin Pichler
(74) *Attorney, Agent, or Firm* — Lando & Anastasi, LLP (57) ABSTRACT

A hinge assembly for a deployable mirror includes a base, a mirror segment base coupled to the base, a mirror segment coupled to the mirror segment base by two bearings, and at least one linear actuator secured to the base and capable of adjusting the mirror segment. Other embodiments of the hinge assembly are further disclosed.

13 Claims, 7 Drawing Sheets

HINGE MECHANISM FOR SMALL OPTICS AND RELATED METHODS

CROSS-REFERENCE TO RELATED APPLICATION

This application is a continuation of U.S. patent application Ser. No. 13/365,399 entitled "HINGE MECHANISM FOR SMALL OPTICS AND RELATED METHODS," filed on Feb. 3, 2012, which is herein incorporated by reference in its entirety.

BACKGROUND

This disclosure relates to mechanisms for deploying segmented mirrors of an optical system, and more particularly to a mechanized hinge that is configured to adjust components of the optical hinge that are moved between use and storage positions.

Some optical systems must be physically smaller for storage or delivery than in use. To achieve more compact configurations, optical elements (such as mirrors) may be moved closer to each other for storage than in use and retained with precision to their use position, or the optical components may be separated into parts and moved into a smaller volume for storage and returned to an operational position with precision, or both.

Some optical systems, such as optical systems employed by NASA, are designed to be delivered in a compact, stowed configuration, and expanded to an operational configuration. NASA currently reduces the size for delivery relative to use only for large, expensive systems. This is predominantly because the mechanisms to enable compaction and later use as an optical system are complex, bulky and expensive. It is relatively easy to reduce the distance between optical components and then restore operational configuration for use. Reducing the dimensions of a single optical component such as a primary mirror is a much more challenging task. The accuracy required for the positioning between components is on the order of a thousandth of an inch. If a single optical component, such as a primary mirror, is composed of multiple physical segments, the accuracy of positioning relative to one another required is on the order of a millionth of an inch. In very small systems, the current techniques and mechanisms used to position the multiple segments of a single optical component are larger and more costly than the entire small system. Further, the required sub-mechanisms are not available to enable current techniques and mechanisms in the size required.

It would be beneficial to provide a hinge mechanism for an optical system having segmented mirrors that exhibits a high degree of precision, and is of relatively low complexity and cost.

SUMMARY OF INVENTION

One aspect of the disclosure is directed to a hinge assembly for a deployable mirror. In one embodiment, the hinge assembly comprises a base, a mirror segment base coupled to the base, a mirror segment coupled to the mirror segment base by two bearings, and at least one linear actuator secured to the base and capable of adjusting the mirror segment.

Embodiments of the hinge assembly further may include at least two flexures configured to couple the mirror segment base to the base. Each flexure may include a first portion connected to the mirror segment base, a second portion connected to the base and a third portion connecting the first portion to the second portion. Each flexure may be fabricated from metal material. The at least one linear actuator may include a first linear actuator secured to the base and capable of adjusting the mirror segment, and second and third linear actuators secured to the base and configured to move the mirror segment base. Each of the first, second, and third linear actuators may be an ultrahigh resolution micro linear actuator. Each bearing may be fabricated from ceramic material. In a certain embodiment, each bearing may have a maximum surface roughness of 0.5 Ra and a maximum deviation from spherical shape of 0.000003 inches.

Another aspect of the disclosure is directed to a hinge assembly comprising a mirror segment base including a body having two inwardly facing first and second bearing seats formed therein, a mirror segment including a outer, oppositely facing surfaces having outwardly facing third and fourth bearing seats formed therein, and first and second bearings each fabricated from ceramic material having a maximum surface roughness of 0.5 Ra and a maximum deviation from spherical shape of 0.000003. In a particular embodiment, the first bearing is positioned between mating first and third bearing seats of the mirror segment base and the mirror segment, respectively, and the second bearing is positioned between mating second and fourth bearing seats of the mirror segment base and the mirror segment, respectively.

Embodiments of the hinge assembly further may include a base, with the mirror segment base being coupled to the base. The hinge assembly further may comprise a first linear actuator secured to the base and configured to adjust the mirror segment, and/or at least two flexures configured to couple the mirror segment base to the base. Each flexure may include a first portion connected to the mirror segment base, a second portion connected to the base and a third portion connecting the first portion to the second portion. Each flexure may be fabricated from metal material. The hinge assembly further may comprise second and third linear actuators secured to the base and configured to adjust the mirror segment base position. Each of the first, second, and third linear actuators may be an ultrahigh resolution micro linear actuator.

Yet another aspect of the disclosure is directed to a hinge assembly comprising a base, a mirror segment base coupled to the base, a mirror segment coupled to the mirror segment base by two bearings, and means for adjusting the mirror segment.

Still other aspects, embodiments, and advantages of these exemplary aspects and embodiments, are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by references signs, the reference signs have been included for the sole purpose of increasing the intelligibility of the figures and description. In the figures, each identical or nearly identical component that is illustrated in various figures is represented by a like numeral. For purposes of clarity, not every component may be labeled in every figure. In the figures:

DETAILED DESCRIPTION

Aspects and embodiments are directed to a hinge assembly that is configured to adjust the position of deployed segments of a mirror, such as petals of a sectored mirror, for example, which are moved from a compact, stowed condition to an operational position. In one embodiment, the hinge assembly includes a base, a mirror segment base that is coupled to the base, and a mirror segment that is coupled to the mirror segment base by two bearings. In a certain embodiment, each bearing is fabricated from ceramic material, such as silicon nitride, having a surface roughness of approximately 0.5 Ra and a maximum deviation from spherical shape of 0.000003 inches. The construction of the bearing system enables the precise movement and adjustment of the mirror segment with respect to the mirror segment base.

The hinge assembly further includes a linear actuator that is secured to the base and configured to finely adjust the attitude of the mirror segment when in an operational position. The hinge assembly may further include two flexures, positioned on opposite sides of the mirror segment base, which couple the mirror segment base to the base. Two linear actuators may be provided to move the mirror segment base with respect to the base with the flexures providing the connection of the mirror segment base to the base.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1:
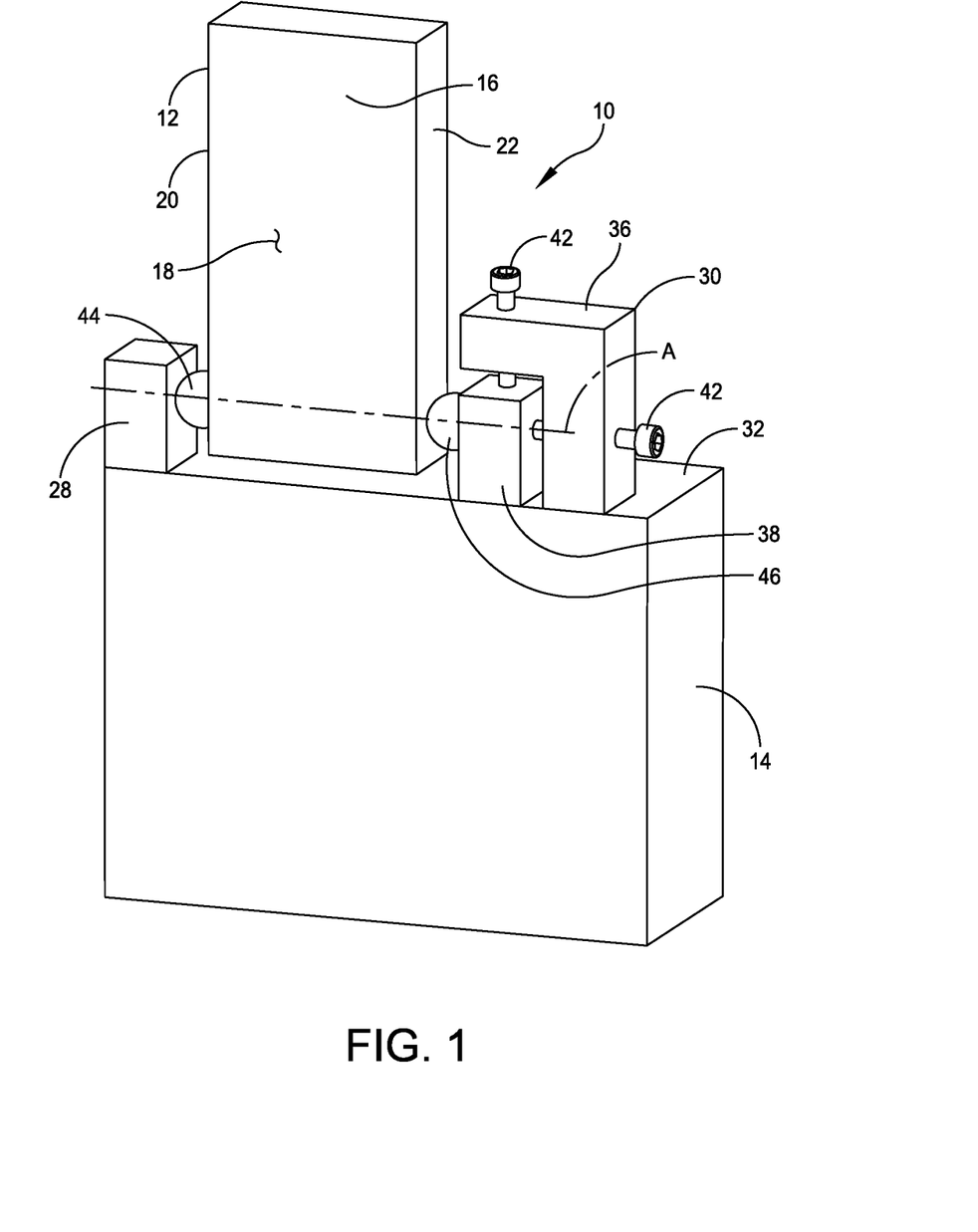
FIG. 1 is a perspective view of a hinge mechanism of an embodiment of the present disclosure.
Figure 2:
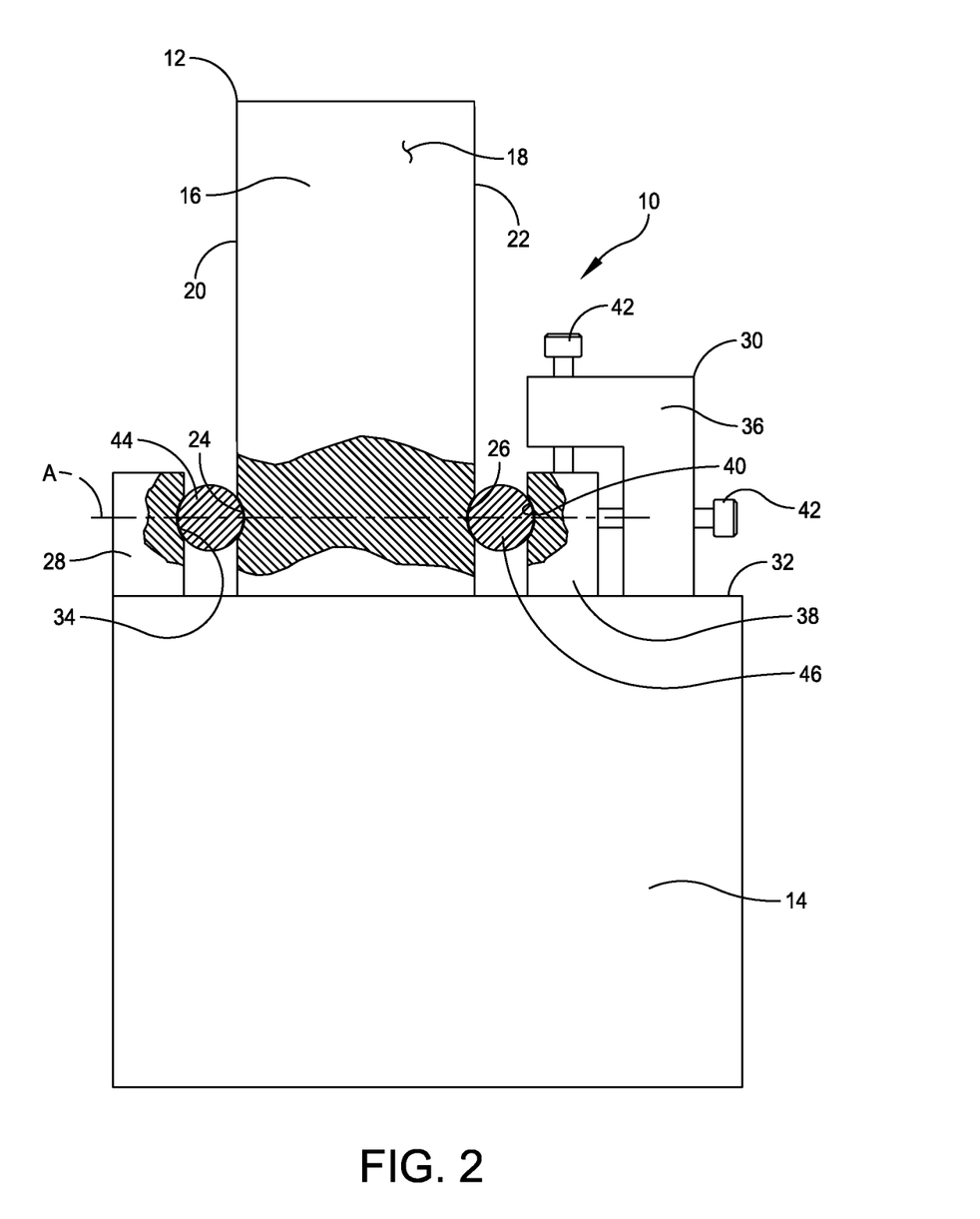
FIG. 2 is a front elevational view with portions in cross section of the hinge mechanism shown in FIG. 2.

To the drawings, and more particularly to FIGS. 1 and 2, there is illustrated a hinge assembly, generally indicated at 10, which provided a proof of concept for a bearing construction of the present disclosure. Specifically, the hinge assembly 10 includes a mirror segment 12 and a base 14 that pivotally supports the mirror segment. As shown, the mirror segment 12 includes a body 16 having a mirrored surface 18 that may form part of an optical system. In one embodiment, the body 16 of the mirror segment 12 further includes opposing side surfaces 20, 22, each having respective bearing seats 24, 26 formed therein. As shown, bearing seat 24 is formed in surface 20 at a lower end of the surface. Similarly, bearing seat 26 is formed in surface 22 at a lower end of the surface. The arrangement is that the bearing seats 24, 26 are symmetrically located on the side surfaces 20, 22 of the mirror segment. The purpose of the bearing seats 24, 26 will become apparent as the description of the hinge assembly 10 proceeds below.

The base 14 of the hinge assembly 10 has a fixed bearing block assembly 28 and a movable bearing block assembly 30, with both bearing block assemblies being secured to a top 32 of the base 14. As shown, the fixed bearing block assembly 28 includes a body in the form of a block having a bearing seat 34 formed therein. The movable bearing block assembly 30 includes a first block portion 36 that is mounted on the base 14 and a second, movable block portion 38 that includes a bearing seat 40 formed therein. The second block portion 38 is positioned to take up all gaps among the mirror segment 12, the fixed bearing block assembly 28, the second block portion, and the bearings described below by a pair of screws, each indicated at 42, that control the movement of the first block portion in orthogonal directions. The vertical example of the pair of screws immobilizes the second block portion 38 after all the gaps are eliminated. The bearing seats 34, 40 are positioned so that the bearing seat 34 of the block of the fixed bearing block assembly 28 faces the bearing seat 40 of the first block portion 36 of the movable bearing block assembly 30. By manipulating the screws 42, the bearing seat 40 of the second block portion 38 can be positioned so that the bearings and the bearing seats 34, 40 are in full contact and that no clearances exist that allow uncontrolled motion. The only motion that is allowed is the rotation of the mirror segment 12 about the axis A.

The fixed bearing block assembly 28 further includes a first bearing 44 that is positioned in the bearing seat 34 of the block of the fixed bearing block assembly and the bearing seat 24 provided in the side surface 20 of the mirror segment 12. Similarly, the movable bearing block assembly 30 includes a second bearing 46 that is positioned in the bearing seat 40 of the second block portion 38 of the movable bearing block assembly and the bearing seat 26 provided in the side surface 22 of the mirror segment. The pair of oppositely facing bearing seats 24, 26 of the mirror segment 12 face respective bearing seats 34, 40 of the fixed bearing block assembly 28 and the movable bearing block assembly 30. As described above, the arrangement is such that by manipulating the screws 42 of the movable bearing block assembly 30, the second bearing 46 may be firmly seated in their respective bearing seats 26, 40. The positioning of the second bearing 46 results in the first bearing 44 being firmly seated in its respective bearing seats 24, 34.

Figure 3:
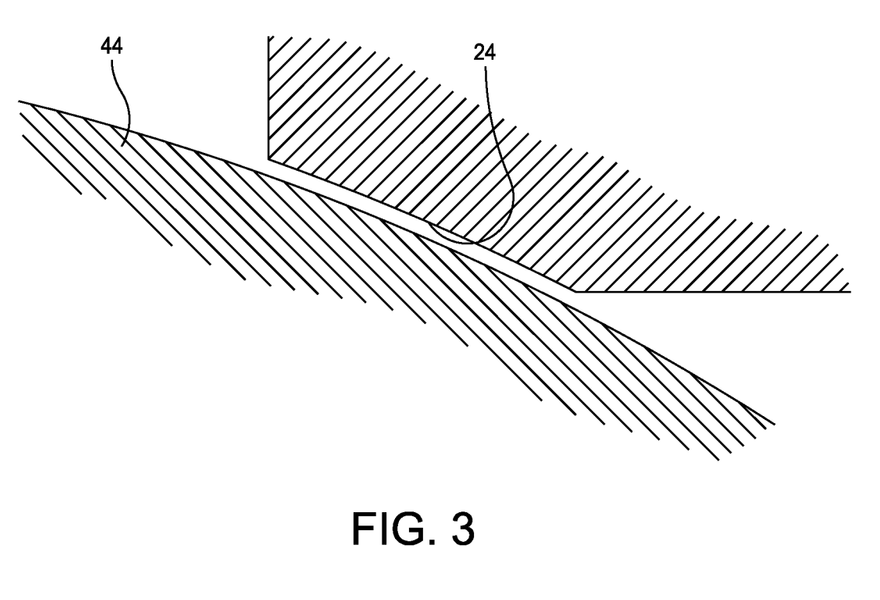
FIG. 3 is an enlarged cross-sectional view of an interface of a bearing and a bearing seat of a bearing assembly of the hinge mechanism shown in FIGS. 1 and 2.

In one embodiment, and with further reference to FIG. 3, each bearing 44, 46 may be a small-diameter bearing, e.g., 0.25 inch diameter, fabricated from ceramic material, such as silicon nitride. In a certain embodiment, each bearing 44, 46 may have a maximum surface roughness of 0.5 Ra and a maximum deviation from spherical shape of 0.000003. As used herein, surface roughness is designated by roughness average (Ra), but may be indicated by other methods of measurement, such as root mean square (RMS). The construction of each bearing 44, 46 with its respective bearing seats 24, 34 and 26, 40, respectively, enables a more precise movement of the mirror segment 12 with respect to the base 14. FIG. 3 illustrates a precise nature of an outer surface of one of the bearings, e.g., bearing 44 with respect to an edge of a bearing seat, e.g., bearing seat 24. One possible method of fabricating the bearing seats 24, 26, 34, 40 will be discussed below with reference to FIG. 7.

In operation, the mirror segment 12 may be pivotally moved about an axis A extending through the first and second bearings 44, 46. The construction of the first and second bearings 44, 46 within the precisely fabricated bearing seats 24, 26, 34, 40 enable the precise movement of the mirror segment 12 about the base 14. The benefits of this construction within optical systems will be apparent as the description of the hinge mechanism 10 proceeds.

Figure 4:
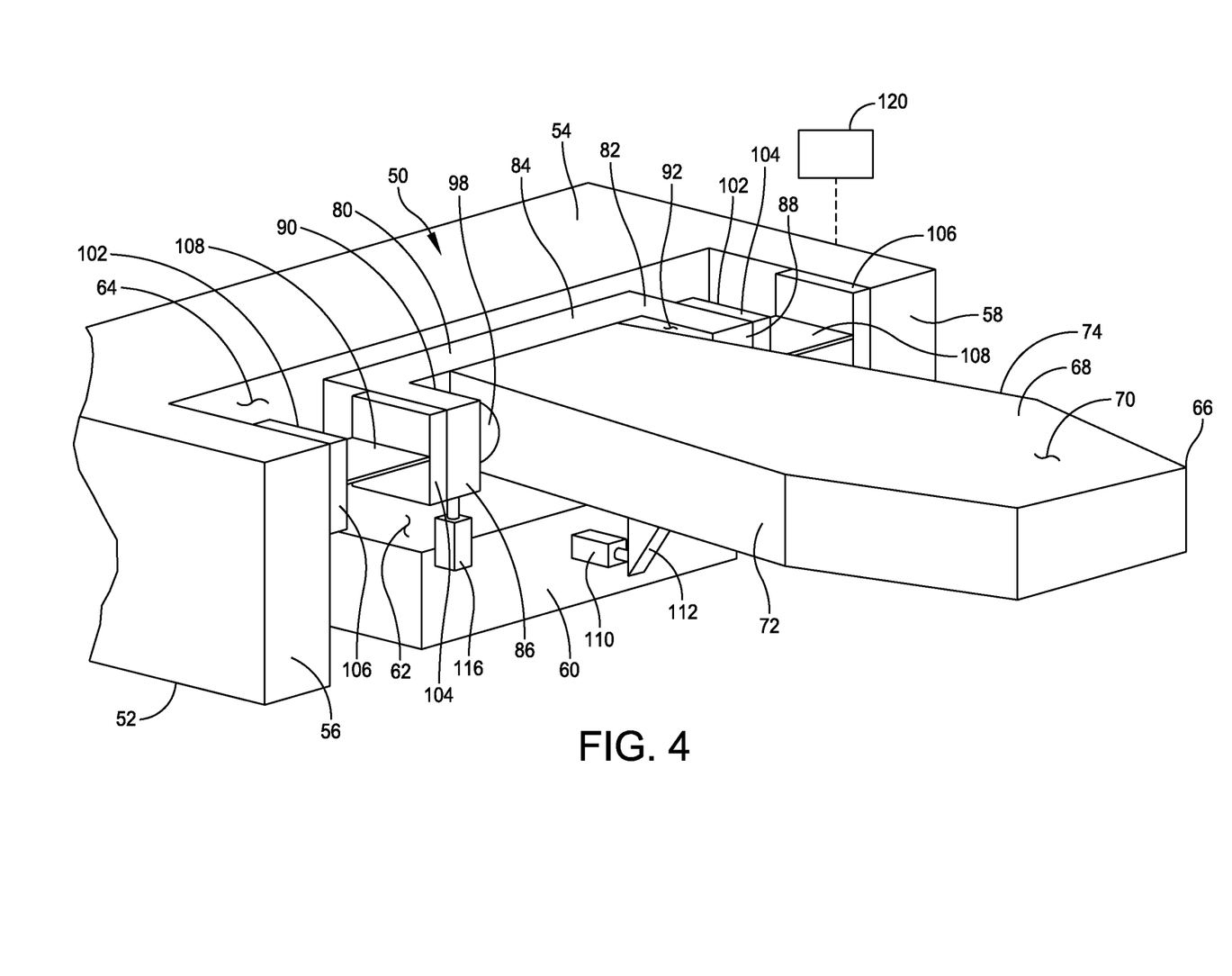
FIG. 4 is a is a top perspective view of a hinge mechanism of another embodiment of the present disclosure with a mirror segment shown in an operational position.
Figure 5:
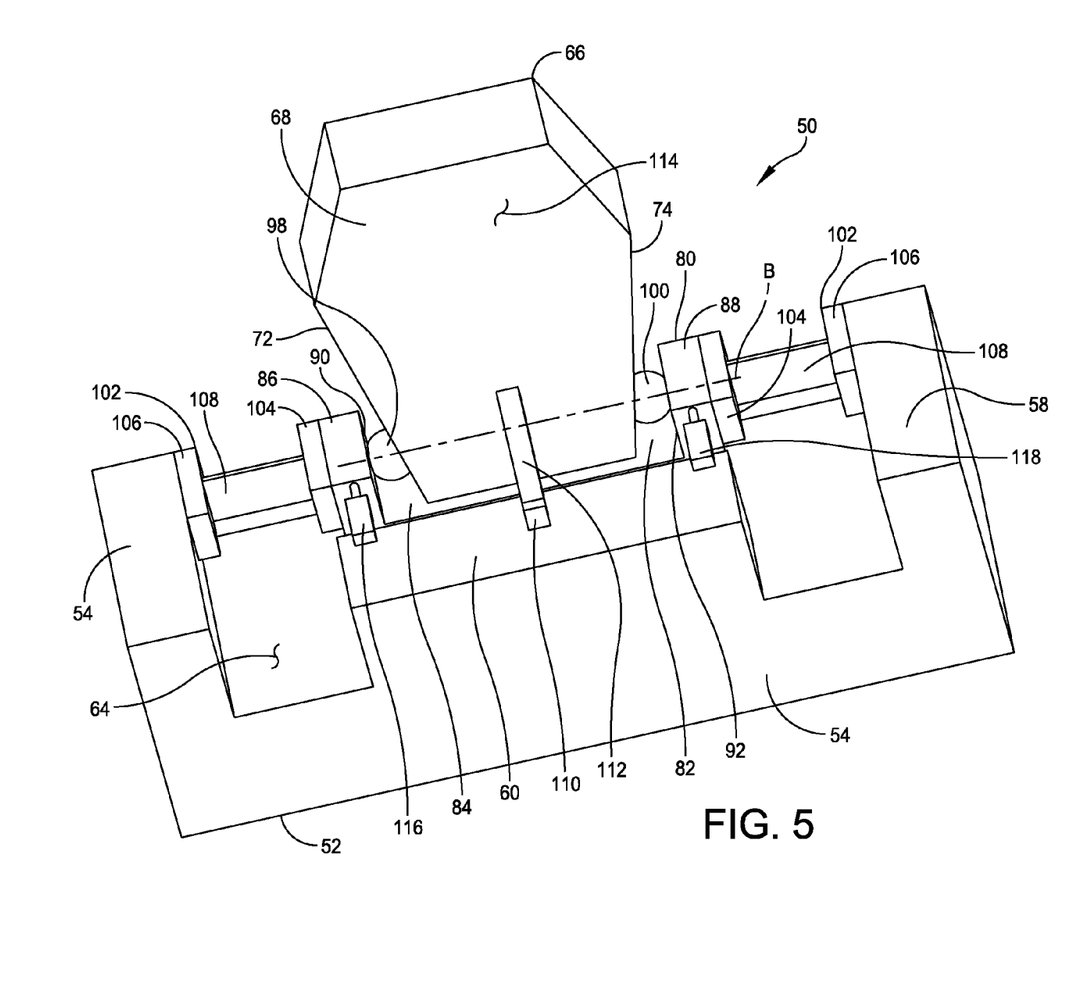
FIG. 5 is a bottom perspective view of the hinge mechanism shown in FIG. 4.
Figure 6:
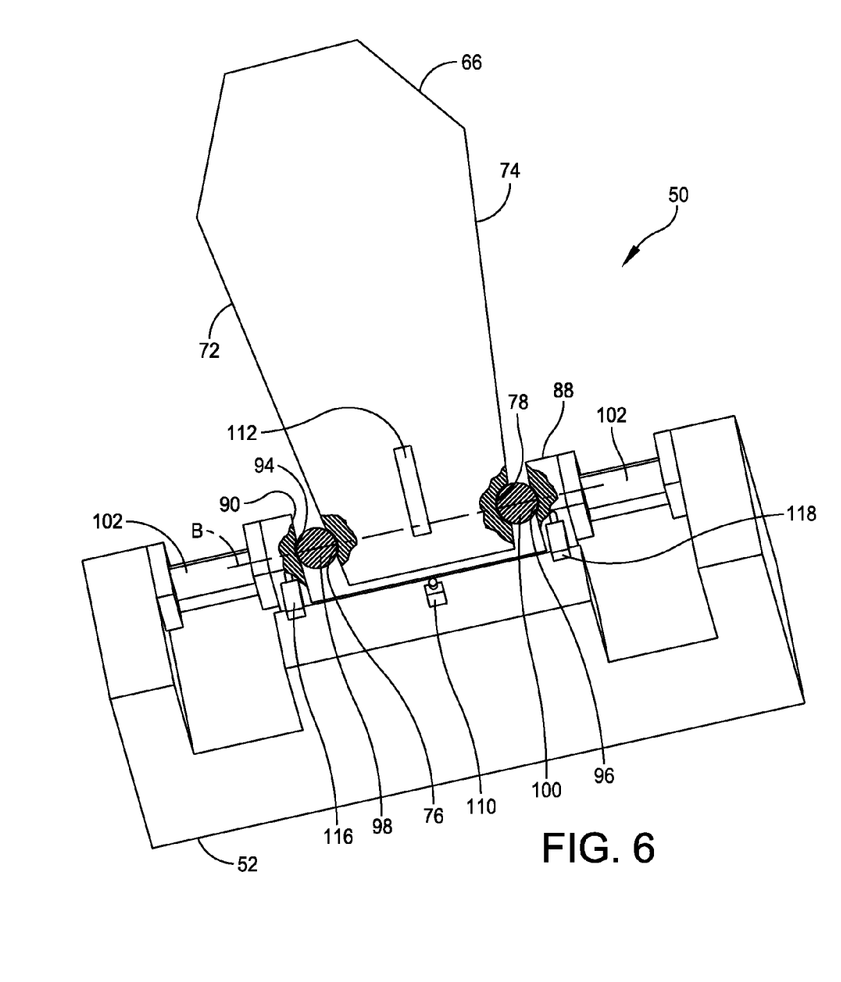
FIG. 6 is a bottom perspective view with portions in cross section of the hinge mechanism shown in FIGS. 4 and 5 with the mirror segment shown in a stowed position.

Referring to FIGS. 4-6, a hinge assembly that can be used within an optical system is generally indicated at 50. As shown, the hinge assembly 50 includes a generally U-shaped base 52 having a back wall 54 and two side walls 56, 58 extending from the back wall. The base 52 further includes a tongue portion 60 that extends from the back wall 54 between the two side walls 56, 58 in a direction parallel to the side walls. The tongue portion 60 includes an upper surface 62, which, along with an inner surface 64 of the back wall 54, defines a shelf of the base 52.

The hinge assembly 50 further includes a mirror segment 66, which is schematically illustrated in FIGS. 4-6. FIGS. 4 and 5 illustrate the mirror segment 66 in an operational position. FIG. 6 illustrates the mirror segment 66 in a stowed position. As with mirror segment 12, the mirror segment 66 includes a body 68 having a mirrored surface 70 that may form part of the optical system. In one embodiment, the body 68 of the mirror segment 66 further includes opposing side surfaces 72, 74, each having respective bearing seats 76, 78 formed therein. As shown, bearing seat 76 is formed in side surface 72 at a lower end of the side surface. Similarly, bearing seat 78 is formed in side surface 74 at a lower end of the side surface. The arrangement is that the bearing seats 76, 78 are symmetrically located on the side surfaces 72, 74 of the mirror segment 66.

The hinge assembly 50 further includes a mirror segment base 80 that is positioned above the shelf of the base 52. The mirror segment base 80 includes a U-shaped body 82 having a back portion 84 positioned near the back wall 54 of the base 52 and two arm portions 86, 88 that extend from opposite ends of the back portion in a direction parallel to the direction of the side walls 56, 58 of the base. The arm portions 86, 88 of the mirror segment base 80 include inner surfaces 90, 92 having bearing seats 94, 96 formed therein. The bearing seats 94, 96 are positioned so that the bearing seat 94 of the arm portion 86 faces the bearing seat 96 of the other arm portion 88. The mirror segment 66 is positioned between the arm portions 86, 88 of the mirror segment base 80 and is pivotally secured to the mirror segment base by a pair of bearings 98, 100. The bearings 98, 100 are constructed similarly as bearings 44, 46. In a certain embodiment, each bearing 98, 100 may be a small-diameter bearing, e.g., 0.25 inch diameter, fabricated from ceramic material, such as silicon nitride. In a certain embodiment, each bearing may have a maximum surface roughness of 0.5 Ra and a maximum deviation from spherical shape of 0.000003. The construction of each bearing 98, 100 with its respective bearing seat 94, 96 enables an extremely repeatable movement of the mirror segment 66 with respect to the mirror segment base 80.

The hinge assembly 50 further includes two flexures, each indicated at 102, that are provided to secure the mirror segment base 80 to the base 52. Each flexure 102 includes a first portion 104 that is connected to the arm portion (86 or 88) of the mirror segment base 80, a second portion 106 that is connected to the side wall (56 or 58) of the base 52, and a third portion 108 that extends between the first portion 104 and the second portion 106. As used herein, a flexure is a hinge that allows motion by bending a load element. A typical flexure is a part that joins together two other parts. For example, a flexure may be made by attaching a long strip of a flexible element to one part, such as the base, to a second part, such as the mirror segment base. The flexures 102 described herein are simple in design, inexpensive to manufacture, compact, lightweight, have zero friction and stiction, and are easy to repair or replace. In one embodiment, each flexure 102 is fabricated from any suitable metal material that enables the movement of the mirror segment base 80 with respect to the base 52. In a certain embodiment, each flexure 102 is fabricated from material that can be repeatedly flexed without degradation. Thus, pliable materials, such as metal, are particularly suited for the optical system disclosed herein. Such pliable materials are capable of being flexed repeatedly without failing. The flexures 102 may be used with other elements (not shown), such as springs.

In order to adjust the mirror segment 66 about the bearings 98, 100, identified by axis B in FIGS. 5 and 6, the hinge assembly 50 includes a first linear actuator 110, which is suitably secured to an end surface of the tongue portion 60 of the base 52. The first linear actuator 110 is constructed to enable the adjustment of the mirror segment 66 in rotation around axis B operating alone, or in piston orthogonally to the back surface 54 when used in concert with actuators 116, 118. In one embodiment, the first linear actuator 110 includes a support, which is connected to the tongue portion 60 of the base 52, and a piston, which forces away a projection 112 of a surface 114 of the mirror segment 66 that is opposite to the mirrored surface 70 to accomplish rotation around axis B.

Once the mirror segment 66 is deployed in the operational configuration, it may be desirable to precisely position the mirrored surface 70 of the mirror segment. In order to finely move the mirror segment 66 in motions other than that provided by actuator 110, the mirror segment base may be moved by second and third linear actuators 116, 118, which are secured to the upper surface 62 of the tongue portion 60 of the base 52. The second and third linear actuators 116, 118 are positioned on the tongue portion 60 of the base so that they engage arm portions 86, 88 of the mirror segment base 80. Each of the first and second linear actuators 116, 118 also includes a support, which is connected to the mirror segment base 80, and a piston, which is connected to the respective arm portion 86 or 88 of the mirror segment base. The flexures 102 enable the friction/stiction-free movement of the mirror segment base 80 with respect to the base 52 in limited degrees of freedom. The third portions 108 of the flexures 102 are much more compliant in motion normal to their large surface than in other directions and allow mirror segment base 80 motion predominantly in "up/down" relative to the surface 70 and rotation about the long axis of the mirror segment 66 (when in the operational configuration). Acting in concert with actuator 110, actuators 116, 118 provide piston motion of the mirror segment relative to the surface 62. In one embodiment, each linear actuator 110, 116, 118 may be a reduced voltage micro linear actuator (model no. SQL-RV-1-8) sold under the brand name SQUIGGLE® by New Scale Technologies, Inc. of Victor, N.Y.

During operation, the mirror segment 66 may be moved between the operational position illustrated in FIGS. 4 and 5 and the stowed position illustrated in FIG. 6 by activating a separate mechanism not shown herein. The mechanism may be any suitable motor configured to move the mirror segment 66, or a simple coiled spring that in the use position applies the projection 112 against the actuator 110. The mirror segment 66 may be precisely manipulated so that the mirrored surface 70 of the mirror segment achieves a certain plane by operating the first, second and third linear actuators 110, 116, 118. A controller 120 may be provided to control the operation of the first, second, and third linear actuators 110, 116, 118. In one embodiment, the controller 120 may be a MC-3000-RV linear action controller provided by New Scale Technologies, Inc., or some other similar controller provided by New Scale Technologies, Inc.

Figure 7:
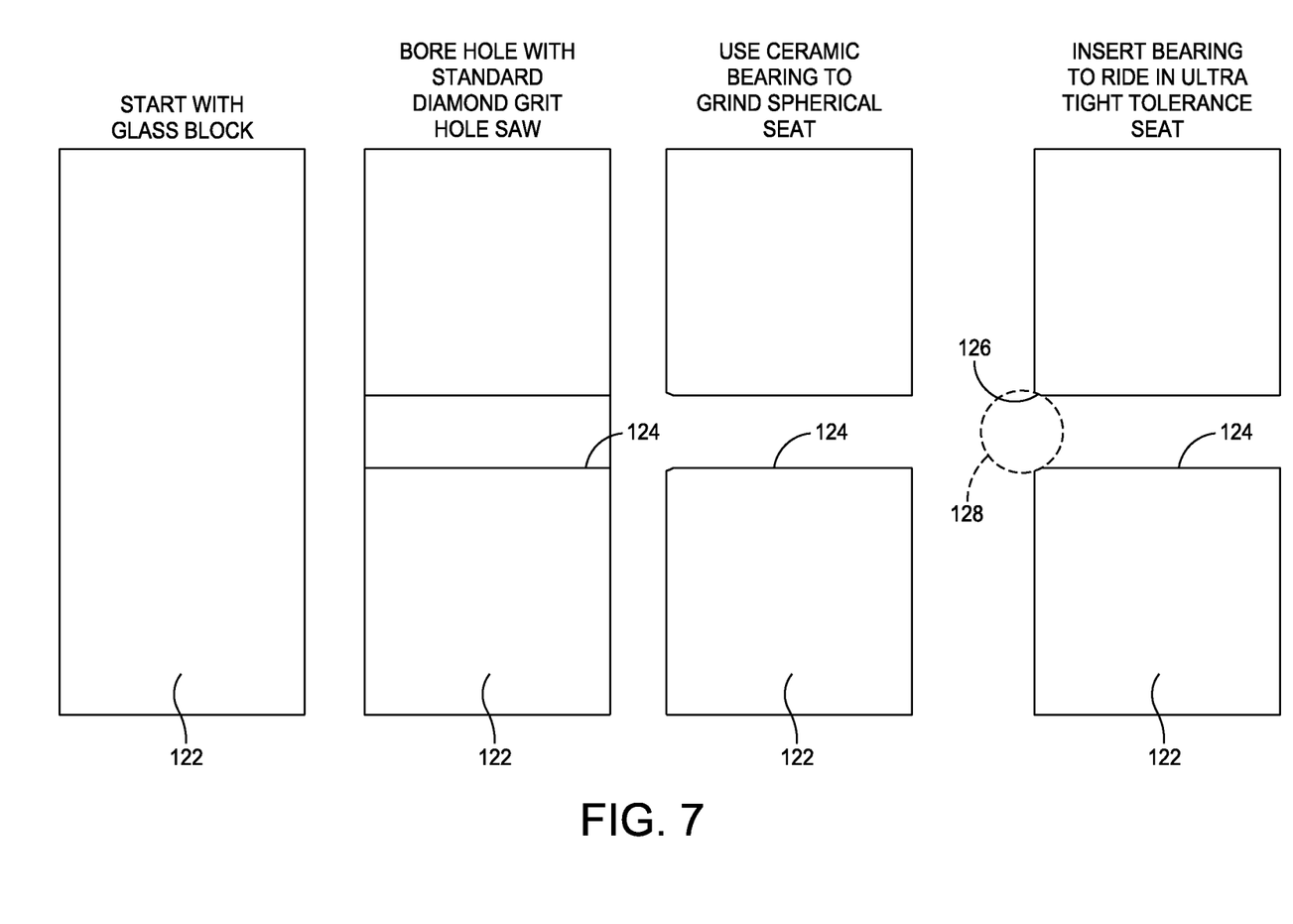
FIG. 7 is a schematic representation of a method for fabricating a bearing seat of a hinge mechanism.

Referring to FIG. 7, a method of fabricating bearing seats is described. As shown, a glass block 122 is provided. A hole 124 is bored through the glass block 122 along axis C with a diamond grit hole saw, for example. Once the hole 124 is bored, a ceramic bearing may be used to grind a spherical seat 126. By using a ceramic bearing having a diameter the same as the ceramic bearing used during operation of the hinge assembly, the profile of the bearing seat 126 matches the outer surface of the ceramic bearing. Once formed, a ceramic bearing 128 may be inserted into the bearing seat 126.

One benefit of the method of fabricating bearing seats described herein is that the method is repeatable, thus capable of providing a reliable and accurate interface between the bearing and the bearing seat. In one embodiment, as mentioned above, the bearing is fabricated from silicon nitride, which is extremely hard, especially when compared to glass and selected metals, such as aluminum. Since silicon nitride is hard, a typical grinding grit or compound can be chosen that is significantly harder than the bearing seat material and much softer than the bearing. These harness differences enable the effective use of bearings as grinding tools. In one embodiment, a bearing may be selected for use as a grinding tool that matches the size and shape of its respective bearing seat. In another embodiment, a series of bearings may be used to grind the bearing seat in a sequential manner. For example, a first bearing may be used with larger and possibly harder grit to quickly remove most of the material to create the seat. Then, if an intermediate grinding step is not used, the actual bearing that is used in the optical assembly may be used with a very fine, minimum hardness grit and used as a final grind tool to make the bearing seat match the surface of the actual bearing being used.

Thus, aspects and embodiments provide a hinge assembly that is capable of precisely manipulate the movement of a mirrored surface that achieves the objects of the present disclosure.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only.

What is claimed is:

1. A method of fabricating bearing seats for a hinge assembly of a movable optical assembly, the method comprising:
   providing a first body of the hinge assembly having a first surface;
   positioning a first bearing on the first surface of the first body; and
   grinding a first bearing seat with the first bearing so that a profile for the first bearing seat matches an outer surface of the first bearing.

2. The method of claim 1, further comprising:
   providing a second body of the hinge assembly having a second surface;
   positioning the first bearing on the second surface of the second body; and
   grinding a second bearing seat with the first bearing so that a profile for the second bearing seat matches an outer surface of the first bearing.

3. The method of claim 2, wherein positioning the first bearing on at least one of the first surface of the first body and the second surface of the second body includes boring a hole within the body and seating the first bearing within the hole.

4. The method of claim 2, wherein the first surface of the first body faces the second surface of the second body.

5. The method of claim 2, further comprising:
   positioning a second bearing on a third surface of the first body; and
   grinding a third bearing seat with the second bearing so that a profile for the third bearing seat matches an outer surface of the second bearing.

6. The method of claim 5, further comprising:
   positioning the second bearing on a fourth surface of the second body; and
   grinding a fourth bearing seat with the second bearing so that a profile for the fourth bearing seat matches an outer surface of the second bearing.

7. The method of claim 6, wherein each bearing has a hardness that is significantly harder than a hardness of a material of the each body forming the bearing seats.

8. The method of claim 7, wherein the bearing seats are fabricated from glass material and the bearings are fabricated from ceramic material.

9. The method of claim 7, wherein the bearings are fabricated from silicon nitride.

10. The method of claim 6, further comprising coupling the second body to the first body, and moving the second body with respect to the first body.

11. The method of claim 10, wherein the first body is a mirror segment base and the second body is a mirror segment.

12. The method of claim 6, wherein each bearing has a maximum surface roughness of 0.5 Ra.

13. The method of claim 12, wherein each bearing has a maximum deviation from spherical shape of 0.000003 inches.

* * * * *